United States Patent [19]

Heertje et al.

[11] Patent Number: 5,652,011
[45] Date of Patent: Jul. 29, 1997

[54] LOW FAT SPREADS AND DRESSINGS

[75] Inventors: Isaac Heertje, Alphen; Hendricus Arnoldus Cornelis Hendrickx, Maassluis; Albertje Johanna Knoops, IJssel; Elias Cornelis Royers, Rotterdam; Hessel Turksma, Delft, all of Netherlands; Leendert Hendrik Wesdorp, Ellicott City, Md.

[73] Assignee: Van den Bergh Foods Co., Division of Conopco, Inc., Lisle, Ill.

[21] Appl. No.: 668,528

[22] Filed: Jun. 18, 1996

Related U.S. Application Data

[63] Continuation of Ser. No. 301,837, Sep. 7, 1994, abandoned, which is a continuation of Ser. No. 974,643, Nov. 12, 1992, abandoned, which is a continuation-in-part of Ser. No. 846,311, Mar. 5, 1992, abandoned.

[30] Foreign Application Priority Data

| Nov. 23, 1990 | [EP] | European Pat. Off. | 90203100 |
| Mar. 7, 1991 | [EP] | European Pat. Off. | 91200487 |
| May 12, 1992 | [EP] | European Pat. Off. | 92201348 |

[51] Int. Cl.$^6$ .................................... A23D 7/015
[52] U.S. Cl. .................... 426/601; 426/602; 426/604; 426/804
[58] Field of Search .......................... 426/601, 602, 426/604, 804

[56] References Cited

U.S. PATENT DOCUMENTS

| 3,026,207 | 3/1962 | Murray . |
| 3,180,736 | 4/1965 | Landfried . |
| 3,216,829 | 11/1965 | Hansen . |
| 3,282,705 | 11/1966 | Hansen . |
| 3,379,535 | 4/1968 | Landfried et al. . |
| 3,502,482 | 3/1970 | Birnbaum . |
| 3,592,660 | 7/1971 | Neu . |
| 3,673,106 | 6/1972 | Jones et al. . |
| 3,800,036 | 3/1974 | Gabby et al. . |
| 3,809,764 | 5/1974 | Gabby et al. . |
| 3,949,102 | 4/1976 | Hellyer et al. . |
| 4,226,890 | 10/1980 | Howard . |
| 4,770,892 | 9/1988 | Grealy et al. . |
| 4,788,075 | 11/1988 | Joseph et al. . |
| 4,873,094 | 10/1989 | Pischke et al. . |
| 4,877,625 | 10/1989 | Dieu et al. . |
| 5,080,921 | 1/1992 | Reimer . |
| 5,082,684 | 1/1992 | Fung . |
| 5,106,644 | 4/1992 | El-Nokaly . |
| 5,120,561 | 6/1992 | Silva et al. . |
| 5,139,803 | 8/1992 | Haynes .......................... 426/330.6 |
| 5,158,798 | 10/1992 | Fung . |
| 5,308,639 | 5/1994 | Fung et al. . |

FOREIGN PATENT DOCUMENTS

| 1180250 | 1/1985 | Canada . |
| 63468 | 10/1982 | European Pat. Off. . |
| 98664 | 1/1984 | European Pat. Off. . |
| 268974 | 11/1987 | European Pat. Off. . |
| 279498 | 8/1988 | European Pat. Off. . |
| 454366 | 4/1991 | European Pat. Off. . |
| 2935572 | 3/1981 | Germany . |
| 8402867 | 9/1984 | Netherlands . |
| 1501106 | 5/1974 | United Kingdom . |
| 1539625 | 1/1979 | United Kingdom . |
| WO 90/9107 | 8/1990 | WIPO . |
| WO 91/00016 | 1/1991 | WIPO . |
| 91/18514 | 3/1991 | WIPO . |
| WO 92/09209 | 6/1992 | WIPO . |

OTHER PUBLICATIONS

"Industrial Gums", Whistler ed. (Academic Press, 1973), pp. 643, 666.
Distilled Monoglycerides, *Food Engineering*, vol. 34 (II), pp. 97–100, (Nov. 1962) by G.H. Doerfert.
Gunstone, Harwood and Padley, "The Lipid Handbook" (Chapman & Hall, 1986) pp. 226–235.
Birnbaum, "Surfactants and Shortenings in Cake Mixing," *The Baker's Digest*, Feb. 1978, pp. 29–38.
Buddemeyer et al., "The Role of Stearyl–2 Lactic Acid in Chemically Leavened Baker Products," *The Baker's Digest*, Aug. 1961, pp. 54–57.
Lutton, "Phase Behavior of Aqueous Systems of Monoglycerides," J.A.O.C.S. 42, pp. 1068–1070.
Krog et al., "Food Emulsifiers and Their Associations with Water," pp. 67–139.
K. Larsson, "Some Effects of Lipids on the Structure of Foods," *Food Microstructure*, vol. 1 (1992) pp. 55–62.
Krog et al., "Swelling Behavior of Lamellar Phases of Saturated Monoglycerides in Aqueous Systems," J. Sci. Fd. Agric., 1973, 24, 691–701.
Krog, "Theoretical Aspects of Surfactants in Relation to Their Use in Bread Making," *Cereal Chemistry*, 58(3):158–164.
"Water Relations of Foods," edited by R. B. Duckworth (Academic Press, 1975) pp. 604–605.
"Microemulsions and Emulsions in Foods," El-Nokaly, ed. (American Chemical Society, 1991) pp. 46–50.
Bailey's Industrial Oil and Fat Products, vol. 3; Chrysam et al., (1985) pp. 73 & 119.

*Primary Examiner*—Carolyn Paden
*Attorney, Agent, or Firm*—Gerard J. McGowan, Jr.

[57] ABSTRACT

A spread or dressing comprising a mesomorphic phase, said product comprising from 0 to 20 wt % of fat, 0.1 to 30 wt % of biopolymers and 0.1 to 30 wt % of edible surfactants.

21 Claims, No Drawings

LOW FAT SPREADS AND DRESSINGS

This application is a continuation of U.S. Ser. No. 08/301,837, filed Sep. 7, 1994, now abandoned, which is a continuation of U.S. Ser. No. 07/974,643, filed Nov. 12, 1992, now abandoned, which is a continuation-in-part of U.S. Ser. No. 07/846,311, filed Mar. 5, 1992, now abandoned. This application also claims priority under Section 120 from PCT/EP91/02143 filed Nov. 12, 1991.

BACKGROUND OF THE INVENTION

The present invention relates to low fat spreads and dressings. In particular to low fat spreads and dressings containing inter alia mesomorphic phases of edible surfactants.

According to the general prior art the structuring of foodstuffs can be accomplished in various ways. Two main routes can be distinguished:

(1) the structuring by biopolymers such as proteins and carbohydrates, and (2) the structuring by "particles" in the widest sense.

In the former case polymeric molecules cross-link to form a tangled, interconnected molecular network in water. In those systems the presence of junction zones or entanglements leads to gel formation and the enclosure of water. Examples of those polymeric substances are starch in puddings, gelatin in desserts and in the water phase of fat spreads, pectin in jams, carrageen in desserts and in the water phase of fat spreads, and many others.

In the second case entities such as air cells, water droplets, fat droplets, crystals, starch granules or casein micelles are dispersed into the food system. Interaction forces between such particles determine the consistency and the physical stability of the food products. Many food systems fall into this category. In yoghurt aggregated protein particles form a network of protein strands. In mayonnaise an "interconnected" structure of oil droplets is responsible for its consistency. In a shortening fat crystals form an interconnected network structure enclosing oil. In a margarine water droplets are dispersed into a continuous network structure of fat crystals and oil. So, this represents a dispersion of particles in a network of particles. Even more complicated structures are found in butter and ice cream. But in all those cases a build-up of structure from particles of particle networks can be distinguished, which is responsible for the consistency of the finished products.

SUMMARY OF THE INVENTION

The present invention provides a new way of structuring the aqueous phase of spreads and dressings. The formation of a mesomorphic phase can give rise to a firm texture and consistency. Surprisingly it has been found that if the aqueous phase of a spread or dressing contains a combination of such a mesomorphic phase and a specific amount of biopolymer this provides inter alia superior low fat products which are less grainy and/or which have a reduced tendency to lose moisture.

Accordingly the present invention relates to a spread or dressing comprising a mesomorphic phase, said product comprising from 0 to 20 wt % of fat, 0.05 to 30 wt % of biopolymers and 0.1 to 30 wt % of edible surfactants.

For the purpose of the invention the term mesomorphic phase is intended to include all semi-ordered phases of water and structuring materials. Mesomorphic phases and their method of preparation are known to food scientists.

The prior art, more in particular S. Friberg "Food emulsions", Marcel Dekker, New York 1976 page 67–139 discloses food emulsifiers and their associations with water. It provides part of the scientific background of the mesomorphic phase behaviour of edible emulsifiers, but does not disclose the use of bulk regions of mesomorphic phases in finished foodstuffs. In this citation application of lamellar- and gel mesomorphic phases in the bakery area are mentioned. These phases are introduced in cake and bread formulations during processing in order to enhance the aerating properties or to enhance complexing with starch. Consequently, in some stage of the processing mesomorphic phases are present. However, after baking, i.e. in the finished foodstuffs, no indications of mesomorphic phase structures could be found by differential scanning calorimetry. Pages 141–213 deal with ice-cream. Pages 166 mentions the possible presence of lamellar phase or gelstructures at the oil-water interface. Ipso facto any such structures are of a very limited size.

Furthermore F. D Gunstone, J. L. Harwood and F. B. Padley, "The lipid handbook", Chapman and Hall, London—New York, 1986, page 227 discloses the use of lamellar phases for aerating in bakery batters, which lamellar phases disappear from the product upon baking as our physical experimental work shows. This citation also discloses enhanced complexing (formation of inclusion compounds) of amylose with a lamellar phase of monoglyceride and water in processed potatoes and other starch based products. However, in the finished food products no mesomorphic phase could be detected.

Also there is WO-A-90/09107 (Grindsted Products A/S) disclosing a stable water-in oil-emulsion (abstract, claim 1). The emulsifier is present in the fatty phase of the emulsion (page 1, line 8; page 5). Judged microscopically the distribution of water showed an excellent, uniform distribution of the water droplets (page 10, line 21). Consequently, the water is contained as a dispersed phase in a continuous fat matrix, as in a classical fat spread such as margarine. There is no question whatsoever of the use of mesomorphic phases. The indicated procedure apparently does not allow fat contents below 16% (claim 2), whereas the use of mesomorphic phases, according to the present invention, allows products to be made in which the fat content is zero. This citation has nothing to do with the use of mesomorphic phases in food products such as spreads and dressings.

Finally there is WO-A-92/09209 (Unilever), which is as far as the subject matter is entitled to the priority date of 23 Nov. 1991, (EP-A-90203100.4) a publication according to art. 54(3) EPC and discloses foodstuff comprising a mesomorphic phase of edible surfactant and less than 80% wt edible oil. Various such foodstuffs are specifically disclosed, one (Example II, 3 in conjunction with Example B of the WO-A-document=Example 3 of EP-A-90203100) discloses a spread and its preparation from a mesomorphic phase based on monoglyceride, sodium stearoyl lactylate and water by making a blend with an aqueous phase containing 1% of sodium caseinate and 0.6% of sodium chloride.

Preferred mesomorphic phases for use in accordance with the invention are lyotropic phases; also preferred are lamellar phases. For the purpose of the present invention, the term lamellar phase refers to any system having a pattern of alternating bilayers of edible surfactants and water. Examples of lamellar phases are lamellar droplet phases, lamellar gel phases and lamellar phases containing extended parallel layers of surfactants and water. In a preferred embodiment of the invention the spread or dressing comprises discrete areas of mesomorphic phase having a particle size between 1 μm and 1,000 μm. Also the spreads or dressings according to the present invention contain at least one biopolymer in an amount from 0.05 to 30 % wt.

In the lamellar phase, surfactants, are believed to form a bilayer structure. It is believed that a bulk lamellar phase consists of stacks of bi-layer structures with an intervening aqueous phase. Products according to the present invention preferably comprise bulk regions of the lamellar phase whereas it has been suggested that known products of the prior art might contain boundary layers of this phase at interfaces, such as those found around oil-droplets in water-continuous fatty products. The present invention provides preferably spreads and dressings comprising at least 5% by volume of mesomorphic phase. It is preferred that these products contain at least one edible surfactant in an amount of from 0.1 to 30% wt. It is recommended that the edible surfactant comprises a partial glyceride, preferably monoglyceride. Particular good results are obtained by using from 1–30% wt of edible nonionic surfactants and from 0.005 to 10% wt of edible ionic surfactant.

For the purpose of the invention the term mesomorphic phase is intended to include all semi-ordered phases of water and edible surfactant material. Examples of mesomorphic phases in accordance with the present invention are cubic, hexagonal, alpha-crystalline gel, beta-crystalline coagel and lamellar phases. Preferred mesomorphic phases for use in spreads in accordance to the invention are hydrophilic crystal phases, most preferred coagel phases. Preferred in dressings are hydrophilic crystal phases, such as coagel phases of alpha ($\alpha$)-crystalline gels.

Spreads or dressings according to the present invention comprise inter alia a mesomorphic phase. The presence of such a phase may be detected by any method suitable for the detection of regular arrangements of structuring materials. Suitable method include for example NMR, electron microscopy, differential scanning calorimetry, light microscopy and X-ray diffraction.

The use of mesomorphic phases in spreads or dressings also leads to many useful features, such as the use as fat replacer, consistency control agent, moisture retention agent and/or flavour release agent.

In a preferred embodiment of the invention the mesomorphic phase consists of hydrophilic crystals, more preferred a coagel phase. These phases are particularly preferred for use in spreads, because the hydrophilic crystals are believed to form a three-dimensional structure of hydrophilic crystals (for example a network). Such a three-dimensional structure may entangle the aqueous phase of the product; resulting in a proper rheology, spreadability and mouthfeel for the product. Similar structures may occur in dressings. In the case of dressings there is a preference for using an alpha-crystalline phase.

Spreads or dressings in accordance to the invention comprise generally less than 20 wt % of fat, 0.05 to 30% of biopolymer and 0.1 to 30% of edible surfactant. Sodium caseinate need not be used as the sole type of biopolymer in the case of spreads, or otherwise. In another embodiment of the invention a spread or dressing is provided, which comprises less than 20 wt % of fat, 0.05 to 30% of biopolymer and 0.1 to 30% of edible surfactant, with the proviso that in the case of spreads no single type of milk protein or egg protein is used as the sole biopolymer.

Although applicants do by no means wish to be bound by any theory it is believed that the mesomorphic phase in products of the invention will generally comprise or contain the edible surfactant as the structuring material this in interaction with strands of biopolymer material.

DETAILED DESCRIPTION OF THE INVENTION

Any edible surfactant may be used although lipidic substances are preferred. However, the use of other, non lipidic surfactants, for example surfactant or amphiphylic carbohydrates is not excluded. In general the preferred edible surfactants are selected from the group consisting of non-ionic surfactants, anionic surfactants and cationic surfactants.

Preferred nonionic surfactants are edible monoglycerides, diglycerides, poly-glycerol esters, non-ionic phospholipids, non-fatty carboxylic acid esters of fatty acid esters, partial sugar-fatty acid esters and, partial fatty acid esters of polyols and mixtures thereof. Especially preferred are monoglycerides and lecithins as nonionic edible surfactants.

Preferred cationic surfactants are cationic phospholipids, cationic non-fatty carboxylic acid esters of fatty acid esters and mixtures thereof.

Preferred anionic surfactants are lactylated fatty acid salts, anionic phospholipids, anionic non-fatty carboxylic acid esters of fatty acid esters and their metal salts, fatty acids and their metal salts and mixtures thereof.

Preferred ionic edible surfactants are alkali metal salts of lactylated fatty acids, e.g. sodium stearoyl lactylate (SSL), citric acid esters, ionic phospholipids (phosphatidic acid (PA), succinated esters and diacetyl tartaric acid ester of monoglyceride (DATEM).

The fatty acid chains used in these surfactants can be of any type and origin. Preferably, however $C_{8-28}$ fatty acid chains are present, more preferred $C_{12-22}$, for example $C_{14-18}$. The fatty acids may for example be saturated, unsaturated, fractionated or hydrogenated and be derived from natural (for example dairy, vegetable or animal) source or synthetic sources.

The total level of edible surfactants in spreads of the invention is from 0.1 to 30%, preferably 1–15%, more preferably 2–10% by weight.

Typical preferred embodiments of the invention as illustrated hereafter by example comprise as structuring agent for the mesomorphic phase a combination of a major amount of a non-ionic surfactant and a minor amount of an ionic co-surfactant.

Generally, the spreads or dressings in accordance to the invention comprise 1–30%, more preferably 2–10 wt. % of nonionic surfactant for example monoglycerides and 0.005–10% more preferred 0.01–1 wt. % of ionic co-surfactant for example an alkali metal salt of a lactylated fatty acid or a diacetyl tartaric acid ester of monoglyceride.

Preferably the nonionic surfactant and the ionic surfactant are used in weight ratios of from 100:1 to 1:10, more preferred 50:1 to 1:1, for example 40:1 to 10:1.

The presence of "non-ionic", "cationic" and "anionic" surfactants is of course dependent on the pH-value of the foodstuff in which the surfactants are used. In this respect if should be noted that normally the pH for spreads and dressings is between 3 and 8, preferably from 3–6.

Suitable biopolymer materials are for example carbohydrates (for example modified starches or gums) and certain proteins. Examples of very suitable biopolymer materials are gelatin, soy protein, xanthan gum, carrageen, pectin, locust bean gum, modified starches (for example Paselli SA2 and N-oil) and microcrystalline cellulose and or mixtures thereof with milk protein.

Also suitable may be the use of two or more different biopolymer materials. There materials are for example used in a weight ratio of 1:10 to 10:1. An example of a suitable mixture of biopolymer materials is a combination of xanthan gum and locust bean gum.

Although applicants do not wish to be bound by this theory, it is believed that the presence of biopolymer materials in the amounts as specified above is advantageous because it provides thickening or gelation of part or all of the water in the product. The resulting product is then believed to consist of a mesomorphic phase for providing the desired firm texture and consistency, while part or all of the water is thickened or gelled, therewith further enhancing product properties. Surprisingly the combined use of such mesomorphic phase and biopolymers in compositions as defined above provides the optimum rheology, mouthfeel and water-retention properties to spreads and dressings of the invention.

The amount of biopolymer in compositions of the invention is dependent on the desired degree of thickening or gelling and the presence of other ingredients in the composition. Usually the amount of biopolymer lies between 0.05 and 30%, more preferably between 0.1 and 25% based on the weight of the product. If modified starch is present as the sole biopolymer material, the level is preferably from 5–20%, when used in combination with other biopolymer materials the level is preferably lower, for example 0.5 to 10 wt %. If other carbohydrates, for example gums are used, their level if preferably from 0.05 to 5 wt %. If gelling proteins, preferably gelatin, are used, their level is preferably from 0.5 to 10 wt %.

Compositions of the invention comprise less than 20 wt % of fat, more preferred from 0 to 10%, most preferred compositions of the invention are substantially free from fat or contain very low levels of fat (say from 0.01 to 2 wt %). Suitable edible triglyceride materials are for example disclosed in Bailey's Industrial Oil and Fat Products, 1979. For the purpose of the invention the term fat also includes other fatty materials, for example sucrose fatty acid polyesters, which may be used as a replacement for part or all of the triglyceride material. However for the purpose of the invention edible surfactants such as monoglycerides are not considered as fats. Monoglycerides for use in spreads are preferably freshly made so as to have good taste.

In addition to the above mentioned ingredients, spreads or dressings in accordance to the invention may optionally contain further ingredients suitable for use in these products. Examples of these materials are sugar or other sweetener materials, EDTA, spices, salt, bulking agents, flavouring materials, colouring materials, acids, preserving agents, vegetable particles etc.

Generally the balance of compositions of the invention will be water. The level of water may be from 10, often from 20 to 99.85 wt %, usually more than 50 wt %, more preferred more than 70 wt % or even more than 80 wt % and less than 99 wt %, more preferred less than 97 wt %.

In the preparation of products in accordance to the invention, the mesomorphic phase may either be prepared before the addition of other ingredients, or the mesomorphic phase may be prepared "in-situ" while other ingredients of the composition are present. In any case however, the formation of the mesomorphic phase, preferably involves the heating of the edible surfactants and water to a temperature above the Krafft temperature, therefore heat-sensitive ingredients or ingredients which could prevent the formation of said phase, should preferably be added after the formation of the mesomorphic phase.

In general the method for preparing spreads and dressings according to the invention involves the mixing of the edible surfactants and water to a temperature just above the Krafft-temperature of the system. Other ingredients, e.g. salt, colouring agents and flavouring ingredients can also be added. The pH can be set to the desired value using e.g. sodium hydroxide or lactic acid. This mixture is then stirred gently until the components are distributed homogeneously. Subsequently the mixture is cooled down, generally while applying shear and mixed with another aqueous phase containing the biopolymer ingredients. This results in a low calorie product with oral properties similar to high and reduced fat spreads or dressings. The fat ingredient of the product, if any, is preferably added after cooling and mixed into the product under stirring e.g. to effect the desired structure formation.

Where gel-forming ingredients in addition to the mesomorphic phase are to be used it may be advantageous to prepare the spread using a split stream process in which a "filled gel" is ultimately formed. In a filled gel split stream process, the mesomorphic phase is formed in one stream and a phase including gelled particles is formed in a second stream, after which the two streams are combined. The gelled particles maintain their individual gelled structures after combination with the mesomorphic phase so that the gelled particles in the second stream become embedded in and "fill" the gelled mesomorphic phase.

A filled gel may also be formed by adding gel particles to the surfactant and other ingredients prior to the information of the mesomorphic phase if the gelled particles are formed form heat-stable gels. For instance, a slurry of gel particles made from heat stable gels such as agar or certain pectines could be added to the ingredients from which the mesomorphic phase is to be formed and the mixture heated and then cooled to form the mesomorphic phase. Provided that the temperature used does not exceed the maximum temperature at which the heat stable gelling agents form gels, the gelled particles retain their identity and a filled gel is obtained.

It has been found that filled gels are advantageously used to form spreads having a minimal amount of surfactant, e.g., less than about 3%, especially down to levels of around, e.g., 1.5%. Thus, where the surfactant is a substance such as a monoglyceride, use of filled gels permits an even further decrease in the monoglyceride level. Preferably, the gelled particles are from 1–100 microns, especially from about 10 to about 50 microns.

The invention will be illustrated by means of the following examples. In the examples unless specified otherwise, all percentages are weight percentages.

EXAMPLE 1

A zero fat spread containing gelatin was made using the following procedure. In a water-jacketed vessel the following ingredients were mixed at 65° C.:

| | |
|---|---|
| Tap water | 95.2% |
| Monoglycerides (Hymono 1103) | 3% |
| Co-surfactant (Admul SSL 2004) | 0.2% |
| Salt | 0.5% |
| Gelatin | 1.0% |
| Na-benzoate | 0.1% |
| CWS β-carotene, flavour | trace |

(Hymono 1103 is 90% mono, ex lard or tallow and Admul SSL 2004 is sodium stearoyl lactylate.)

The pH was set to 5.0 using lactic acid. The mesomorphic phase thus obtained was processed using a Votator A-unit (1500 rpm, $T_{ex} \cong 12°$ C., 2.5 Kg/h) followed by a low speed C-unit (100 rpm). After packing the product was stored at 5°

C. The product was stable and spreadable. The oral response was fatty, combined with quick oral break-down characteristics.

EXAMPLE 2

Example 1 was repeated with the following ingredients:

| | |
|---|---|
| Tap water | 92.2% |
| Monoglycerides (Hymono 1103) | 5% |
| skimmed milk powder | 1% |
| Co-surfactant (Admul SSL 2004) | 0.2% |
| Salt | 0.5% |
| Gelatin | 1.0% |
| Na-benzoate | 0.1% |
| CWS β-carotene, flavour | trace |

The final product differed from the one made by example 1 in that the appearance was more white and less translucent. The taste contribution of the milk proteins (and lactose) could clearly be observed in the final product.

EXAMPLE 3

A pasteurized zero fat spread of identical composition as example 2 was made. This was done by first making a mesomorphic phase in which all ingredients are homogeneously mixed at 65° C. Then the mixture is led through a tubular heat exchanger in which the mesomorphic phase is heated to 80° C. for a period of 45 seconds. Subsequently the mixture is cooled down to 65° C. using a second tubular heat exchanger and processed using a Votator A-unit.

The product was packed under 'sterile' conditions using a lamellar flow cabinet and pre-sterilized tubs of 250 ml. Microboilogical examination of the product one month after production did not show any micro-biological activity.

EXAMPLE 4

A split stream zero fat product containing biopolymers was made using the following ingredients:

In one water-jacketed vessel the following ingredients were mixed:

| gel phase | |
|---|---|
| Tap water | 91.4% |
| Monoglycerides | |
| saturated (Hymono 8903) | 4% |
| unsaturated (Hymono 7804) | 3% |
| Co-surfactant (Admul SSL 2004) | 0.5% |
| Salt | 1% |
| Potassium sorbate | 0.1% |
| CWS β-carotene, flavour | trace |

(Hymono 8903 is 90% mono, ex saturated palm oil and Hymono 7804 is 90% mono, substantially unsaturated, vegetable oil.)

In a second water-jacketed vessel the following ingredients were mixed:

| biopolymer phase | |
|---|---|
| Tap water | 87% |
| Gelatin (acid, 250 bloom, ex PB Gelatin) | |
| Paselli-SA2 | 8% |
| Salt | 1% |
| CWS β-carotene | trace |

(Paselli-SA2 is modified starch, ex AVEBE, Netherlands)
Both water phases were first processed using a high shear Votator A-unit, after which the products were mixed in a subsequent C-unit (250 rpm, $T_{ex}$ = 15° C.). The final product consisted for 25% of the gel phase and for 75% of the biopolymer phase.

The final product consisted of a continuous mesomorphic phase in which the biopolymer phase was finely and homogeneously dispersed. The product was plastic and spreadable with good organoleptic properties.

EXAMPLE 5

A very low fat spread containing 20% triglyceride materials was made in-line using the dual-line method. In one part of the processing line, consisting of a water-jacketed vessel and a Votator A-unit a mesomorphic phase is prepared as from the following ingredients:

| | |
|---|---|
| Distilled water | 93.6% |
| Monoglycerides (Hymono 1103) | 6% |
| Co-surfactant (Admul SSL 2004) | 0.3% |
| Xanthan gum | 0.3% |
| Potassium sorbate | 0.1% |
| Cold water soluble (=CWS) β-carotene | trace |
| Flavour | trace |
| Lactic acid | trace |

The water was heated in a water-jacketed vessel until a temperature of 65° C. At that point all other ingredients were added to the water and the mixture was stirred gently, using a 'ribbon stirrer', for about 30 minutes. The pH of the resulting mesomorphic phase was set to a value of 4.6 using lactic acid.

In another part of the processing line a low fat spread is made using a water-jacketed vessel, two subsequent A-units and a final C-unit. The composition of this phase is as follows:

| | |
|---|---|
| Tap water | 55% |
| fat phase (a blend of bean oil, partially hardened bean-oil and partially hardened palm oil) | 40% |
| Gelatin (acid, pigskin, 200 bloom ex PB) | 3% |
| BMP (acid type buttermilk powder, ex. Frico) | 1% |
| Salt | 1% |
| β-carotene, flavour | trace |

After processing the mesomorphic phase in the A-unit (high shear) and the water/fat phase in the A-A-C-sequence, both products are mixed in at a weight ratio of 1:1 using a medium speed C-unit.

The resulting product was bi-continuous in mesomorphic and fat phase. Its physical and organoleptic properties were similar to that of a conventional low fat spread having a triglyceride content of about 40%.

EXAMPLE 6

A margarine-like spread was formed from 50% each by weight of a mesomorphic phase and an aqueous phase. The mesomorphic phase was formed from the following ingredients:

| | |
|---|---|
| Distilled monoglycerides, derived from fully hydrogenated palm oil | 5.15 |
| DATEM ester (PANODAN FPDX from Grindsted) | 0.35 |
| Cold Water Soluble Betacarotene | minor |
| Water | 94.5 |

(DATEM ester is diacetyl tartaric acid esters of monoglycerides)

The mesomorphic phase was formed by heating water to 90° C., cooling it to 58° C., adding the monoglycerides and waiting 10 minutes as they dispersed. The DATEM was added and the mixture was stirred for 2 hours, while keeping the temperature between 50°–55° C. A homogeneous viscous mixture is obtained with an egg-white like consistency. The mixture was cooled at 30 kg/hr in a pilot plan A-unit at 800 rpm to/5° C. and sheared to 5° C. in a 0.7 liter C-unit at 600 rpm where it exited at 16° C. Samples taken at this point set quickly to a margarine-like consistency. The pH of the mesomorphic phase was determined to be 3.0. The aqueous phase was formed from the following ingredients:

| | |
|---|---|
| gelatin | 4% |
| Remyrice AC (waxy rice starch) | 2% |
| Buttermilk powder | 4.7% |
| Salt | 2.4% |
| Potassium sorbate | 0.26% |
| Lactic acid | 0.25% |
| Flavour | 0.0048 % |
| Water | balance |

The mixture was heated to 60° C., pasteurized and fed at 30 kg/hr into a pilot plant A-unit at 700 rpm and cooled to 12.6° C. The mixture was given residence time to gel under shear in a 3.2 l C-unit at 150 rpm. It exited at 17° C. The pH of the mixture was determined to be 4.8 the aqueous phase, now comprising a slurry of gelled particles, was combined with the mesomorphic phase in a static mixer. A portion of the product exiting from static mixer was recirculated to the front of the mixer to ensure a homogeneous product. The exit temperature was 17° C.

The evolving spread had initially a soft, mayonnaise-like consistency, but hardened up to a very margarine-like consistency when during the first 9 days of storage the mesomorphic phase changed form the α-crystalline to the Beta-coagel state. The product consisted of a continuous mesomorphic phase in which gelation/starch gelled particles are dispersed. The hardness at 5° C. was 200, the product was judged by a expert panel to have a very margarine-like consistency and a melting behaviour comparable to that of a 40% fat spread.

EXAMPLE 7

Example 6 was repeated, but the temperature of the aqueous phase before the mixing step was increased to 22° C. Only a minor part of the aqueous phase was gelled before mixing with the mesomorphic phase. The resulting product had a gelatin-pudding like consistency, indicating that the continuous phase now also contained substantial amounts of the gelling agents in the mesomorphic phase causing loss of its spread-like consistency. The product had a good melting behaviour and a creamy mouthfeel.

EXAMPLE 8

Example 6 was repeated, but the temperature in the tank, holding the mesomorphic phase was increased to 80° C. The Krafft temperature was 55° C. A phase split occurred and the mixture no longer was a homogeneous, viscous mesomorphic phase, but a thin, watery liquid containing little white spots. It is believed to consist of water in which a minor amount of a concentrated monoglyceride phase is dispersed.

After cooling, just before feeding into the static mixer, the consistency of the would be mesomorphic phase was still very water indicating that a mesomorphic phase had, in fact, not formed. The final product had a grainy, gelatin-pudding like structure and a sharp, watery mouthfeel.

EXAMPLE 9

The following compositions were made on a small scale by adding the salt, sorbate, carotene and xanthan and/or locust bean gum to water of 58° C. followed by the addition of the Hymono 8903 and Datem 1935 and stirring for 45 minutes. The pH was set with a 10% lactic acid solution. The products were cooled in an A-unit at a stir rate of 2000 RPM to 10° C. and filled into 250 g tubs.

All products were of good quality with respect to spreadability, mouthfeel and water retention capacity.

| Composition | A | B | C | D | E | F | G | H | I | J | K | L |
|---|---|---|---|---|---|---|---|---|---|---|---|---|
| Hymono 8903 ex Quest Int. | 3.00 | 3.00 | 3.00 | 3.00 | 3.00 | 3.00 | 3.00 | 3.00 | 3.00 | 3.00 | 3.00 | 3.00 |
| Datem 1935 ex Quest Int. | 0.20 | 0.20 | 0.20 | 0.20 | 0.20 | 0.20 | 0.20 | 0.20 | 0.20 | 0.20 | 0.20 | 0.20 |
| cws β-carotene | 0.05 | 0.05 | 0.05 | 0.05 | 0.05 | 0.05 | 0.05 | 0.05 | 0.05 | 0.05 | 0.05 | 0.05 |
| xanthan gum | 0.25 | 0.25 | 0.25 | 0.25 | 0.25 | 0.25 | 0.25 | — | 0.12 | 0.12 | — | — |
| locust bean gum | 0.25 | 0.25 | 0.25 | 0.25 | 0.25 | 0.25 | — | 0.25 | 0.12 | — | 0.12 | — |
| salt | 1.00 | 1.00 | 1.00 | 1.00 | 1.00 | 1.00 | 1.00 | 1.00 | 1.00 | 1.00 | 1.00 | 1.00 |
| K-sorbate | 0.10 | 0.10 | 0.10 | 0.10 | 0.12 | 0.12 | 0.12 | 0.12 | 0.12 | 0.12 | 0.12 | 0.12 |
| water up to 100% | | | | | | | | | | | | |
| pH | 3.5 | 3.8 | 4.0 | 4.2 | 4.4 | 4.25 | 4.25 | 4.25 | 4.25 | 4.25 | 4.25 | 4.25 |

EXAMPLE 10

A low calorie pourable dressing was made using the following ingredients:

| | |
|---|---|
| gel phase | 33.5% |
| (mixture of 3.5% monoglyceride (Hymono 8803) 0.14% Datem, the balance being water) | |
| water phase: | |
| water | 31% |
| sugar | 15% |
| salt | 1.4% |
| cider vinegar (5% acetic acid) | 13% |
| tomato paste | 3% |
| (ex Del Monte, double concentrated) | |

-continued

| | |
|---|---|
| flavours | 1.5% |
| biopolymeric thickeners* | 0.5% |
| potassium sorbate | 0.1% |
| sunflower oil | 1% |

*3:1 mixture of xanthan gum and propylene glycol alginate (LVF)

The gel phase and the water phase were prepared in separate streams. The gel phase was made by heating the gel phase ingredients to 65° C. in a water-jacketed vessel under gentle stirring for about 30 min. Subsequently the mesomorphic phase was cooled using a scraped surface heat exchanger (Votator, A-unit) to a temperature of 12° C. The A-unit was operated at a throughput of 2 kg/h and a rotor speed of 1150 rpm.

The water phase was made by dissolving the water phase ingredients in a water-jacketed vessel under gentle stirring. The water phase with a throughput of 4 kg/h is combined with the gel phase just after its formation in the A-unit and introduced into a cooled pinned stirrer (C-unit), which was operated with a rotor speed of 700 rpm.

The final product, which had a pH of 3.5, had the properties of a pourable dressing. Consistency, mouthfeel and taste were comparable to a reference product containing 36% of oil and compared favourably with products, with 1% oil, containing biopolymeric thickeners only.

EXAMPLE 11

Under the same conditions as in example 10, apart from the composition of the gel phase, a spoonable low calorie dressing was made. The composition of the gel phase was: 6% Hymono 8803, 0.24% DATEM and the balance water. This provided a thicker product, with all characteristics of a spoonable dressing. Its properties were comparable both to a commercial mayonnaise (80% fat) as well as to a reduced fat (35% fat) mayonnaise and compared favourably to products containing polymeric thickeners.

EXAMPLE 12

Under the same conditions as in example 10, apart from the composition of the gel phase, a very thick dressing was made. The composition of the gel phase was: 10% Hymono 8803, 0.4% DATEM and the balance water. This led to a very thick product, with low fat spread like - consistency and - fatty impression.

EXAMPLE 13

A 10% fat dressing was made by dispersing the 10% of oil in the water phase to obtain an O/W emulsion, followed by mixing with the mesomorphic phase. The dressing was made using the following ingredients:

| | |
|---|---|
| gel phase | 32.7% |
| (10% Hymono 8803, 0.4% PA(*), balance water, trace CWS β-carotene) | |
| Water phase (emulsion) | |
| water | 29% |
| sugar | 13% |
| salt | 1.2% |
| cider vinegar (5% acetic acid) | 12% |
| flavours | 1.5% |
| biopolymere (3:1 xanthan gum, propylene glyc. alginate. LVF) | 0.5% |
| potassium sorbate | 0.1% |
| sun flower seede oil | 10% |

PA is di-stearoyl phosphatidic acid (ex Sigma)

The water phase emulsion was prepared by dispersing the oil the water phase by means of a high speed stirrer and homogenizer. The water phase emulsion was combined with the mesomorphic phase as indicated in example 10. A product with proper consistency and organoleptic properties was obtained, with an oil phase containing a large amount of poly unsaturated fatty acids, with the usual health claims.

EXAMPLE 14

A 5% fat dressing was made by dispersing the oil in the gel phase, followed by mixing with the water phase. The dressing was made using the following ingredients:

| | |
|---|---|
| gel phase (with dispersed oil) | 33% |
| {8.5% Hymono 3203, 0.34% DATEM, balance water, CWS β-carotene (trace), 15% sunflower oil} | |
| water phase | |
| water | 34.5% |
| sugar | 15% |
| salt | 1.4% |
| cider vinegar (5% acetic acid) | 14% |
| flavours | 1.5% |
| thickeners | 0.5% |
| (3:1 xanthan gum, propylene glyc. alg. LVF) | |
| potassium sorbate | 0.1% |

The gel phase with dispersed oil was prepared by mixing oil and gel phase from separate streams just after formation of the gel phase in a continuous processing line. The gel phase containing oil is combined with the water phase as indicated in example 10.

We claim:

1. A spread or dressing comprising bulk regions of a mesomorphic phase of edible surfactant which structures the foodstuff, said spread or dressing product comprising from 0 to 20 wt. % of fat, 0.05 to 30 wt. % of biopolymer and 0.1 to 30 wt. % of edible surfactant said mesomorphic phase of edible surfactant structuring the spread or dressing.

2. A spread or dressing according to claim 1, comprising discrete areas of mesomorphic phase having a particle size between 1 μm and 1,000 μm.

3. A spread or dressing according to claim 1, wherein at least 5% by volume of the product is in the form of a mesomorphic phase.

4. A spread or dressing according to claim 1, wherein the mesomorphic phase is a hydrophilic crystal phase, preferably a coagel phase.

5. A spread of dressing according to claim 1, comprising a three-dimensional structure of hydrophilic surfactant crystals.

6. A dressing according to claim 1, wherein the mesomorphic phase is an α-crystalline phase.

7. A spread or dressing according to claim 1, comprising biopolymers selected from the group of carbohydrates and proteins and mixtures thereof.

8. A spread or dressing according to claim 7, wherein the biopolymer is selected from the group of gelatin, soy protein, xanthan gum, locust bean gum, pectin, carrageen, starch, microcrystalline cellulose and/or mixtures thereof with milk protein.

9. A spread or dressing claim 1 comprising from 0–10 wt % of fat.

10. A spread or dressing according to claim 9 being substantially free from fat.

11. A spread or dressing according to claim 1 comprising from 20–99.85 wt % of water.

12. The spread or dressing according to claim 11 comprising 50–98 wt % water.

13. The spread or dressing according to claim 12 comprising 80–97 wt % of water.

14. A spread or dressing according to claim 1 wherein the edible surfactant comprises a partial glyceride.

15. The spread or dressing according to claim 14 wherein the edible surfactant is a monoglyceride.

16. A spread or dressing according to claim 1, wherein the edible surfactant comprises a nonionic surfactant selected from the group of monoglycerides and lecithins or mixtures thereof.

17. A spread of dressing according to claim 1 comprising a mixture of a nonionic edible surfactant and an ionic edible surfactant of the class consisting of alkali-metal salts of lactylated fatty acids, more preferably sodium stearoyl lactylate, citric acid esters, ionic phospholipids, succinated esters and diacetyl tartaric acid esters of monoglyceride in a weight ratio nonionic to ionic of from 100:1 to 1:10.

18. The spread of claim 1 wherein sodium caseinate is not used as the sole type of biopolymer.

19. The spread or dressing according to claim 1 wherein the mesomorphic phase is a continuous phase.

20. The spread or dressing according to claim 1 wherein the composition comprises more than 80% water.

21. A process for preparing a spread or dressing comprising bulk regions of a mesomorphic phase of edible surfactant which structures the foodstuff, said spread or dressing product comprising from 0 to 20 wt % of fat, 0.05 to 30 wt % of biopolymer and 0.1 to 30 wt % of edible surfactant, comprising the step of heating the edible surfactant in the presence of water to a temperature above the Krafft temperature of the system to form a mesomorphic phase, feeding the mesomorphic phase in a first stream, forming in a second stream a solution or gel of the biopolymer and mixing said solution or gel with said mesomorphic phase said mesomorphic phase of edible surfactant structuring the spread or dressing.

\* \* \* \* \*